US007266194B2

(12) United States Patent
Saeki et al.

(10) Patent No.: US 7,266,194 B2
(45) Date of Patent: Sep. 4, 2007

(54) SELF-LIGHTING TYPE PUSH BUTTON INPUT DEVICE

(75) Inventors: Tsuyoshi Saeki, Tokyo (JP); Mahito Hamada, Tokyo (JP); Takeshi Nishimura, Tokyo (JP); Akira Senzui, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 204 days.

(21) Appl. No.: 10/960,763

(22) Filed: Oct. 8, 2004

(65) Prior Publication Data

US 2005/0078815 A1 Apr. 14, 2005

(30) Foreign Application Priority Data

Oct. 10, 2003 (JP) ............................ 2003-351715

(51) Int. Cl.
*H04M 1/00* (2006.01)
*H04M 3/00* (2006.01)

(52) U.S. Cl. ................................ 379/368; 379/433.07

(58) Field of Classification Search ................ 379/368, 379/433.07

See application file for complete search history.

(56) References Cited

U.S. PATENT DOCUMENTS 4,349,705 A * 9/1982 Kuhfus ....................... 379/361
5,128,842 A 7/1992 Kenmochi
5,521,342 A 5/1996 Bartley et al.
6,184,863 B1 * 2/2001 Sibert et al. ................ 345/156
6,784,874 B1 * 8/2004 Shimizu ..................... 345/173

FOREIGN PATENT DOCUMENTS

| | | |
|---|---|---|
| EP | 0 884 525 | 12/1998 |
| EP | 0 921 515 | 6/1999 |
| GB | 2 285 518 | 7/1995 |
| JP | 11-224556 A * | 8/1999 |

OTHER PUBLICATIONS

European Search Report for European Appl. No. 04024198.6 (Mar. 1, 2005).

* cited by examiner

*Primary Examiner*—Ramnandan Singh
(74) *Attorney, Agent, or Firm*—Cermak Kenealy & Vaidya LLP

(57) ABSTRACT

A self-lighting type push-button input device according to the presently disclosed subject matter can include a button base portion formed of a transparent material. Holes can be formed in predetermined positions of the button base portion, and spring portions can be formed integrally with the holes by molding transparent silicone rubber with a light diffusing agent incorporated therein. The button base portion serves as a light conducting portion, and the spring portions can uniformly diffuse the light distributed thereto by the light conducting portion, whereby lighting can be effected by a reduced number of light sources, effecting a reduction of size and cost.

19 Claims, 5 Drawing Sheets

Fig. 11 CONVENTONAL ART

SELF-LIGHTING TYPE PUSH BUTTON INPUT DEVICE

This application claims the priority benefit under 35 U.S.C. §119 of Japanese Patent Application No. 2003-351715, filed on Oct. 10, 2003, which is hereby incorporated by reference.

BACKGROUND OF THE INVENTION

1. Field of the Invention

The present invention relates to a self-lighting type push-button input device such as an operating panel of a portable telephone wherein plural push buttons are provided for input and are illuminated for convenience in using the input device in a dark place at night for example.

2. Description of the Related Art

FIG. 11 shows a constructional example of a conventional self-lighting type push-button input device 90. In the input device 90, a part of a push-button 91 and a spring portion 92 are formed using silicone rubber with a light diffusing agent incorporated therein for example, the spring portion 92 are formed using silicone rubber with a light diffusing agent incorporated therein for example, the spring portion 92 being adapted to deflect upon depression of the push-button portion 91 and give a stroke to the push-button portion 91, and a key top portion 93 formed of a transparent or milk-white resin is mounted so as to cover the push-button portion 91.

Further, a light conducting portion 94 formed of a transparent and rigid resin is embedded in the silicone rubber by integral molding at a position in under the push-button 91 and inside the spring portion 92. It is the construction of one push-button 95 that has been described above. In this conventional example, plural push-button units 95 are connected side by side through a base portion 96 formed of the silicone rubber referred to above. A light source 97, e.g., LED lamp, is disposed face to face with the light conducting portion 94 in each in each of the push-button units 95 to effect illumination.

[Patent Literature 1]

Japanese Unexamined Utility Model Publication No. Hei 7 (1995)-10701

In the above conventional push-button input device 90, since the push-button portion 91 is formed using silicone rubber with a light diffusing agent incorporated therein, light is diffused uniformly in the push-button portion 91 and there is obtained a key top surface of uniform brightness, thus affording a product superior in quality impression.

In the conventional push-button input device 90, however, the base portion 96, as a portion other than the push-button 91 for which the diffusion of light is required, is also formed using silicone rubber with a light diffusing agent incorporated therein, so that when light is to be propagated by utilizing the base portion 96, a great propagation loss occurs due to the diffusion. As a result, as noted above, it is required that one light source be provided for each of the push-button units 95, thus giving rise to the problem of an increase of cost.

SUMMARY OF THE INVENTION

According to one aspect of the invention there is provided a self-lighting type push-button input device comprising a button base portion formed of resin in a generally plate shape, a plurality of spring portions formed of a rubbery resin so as to permit a stroke motion thereof relative to button base portion, a plurality of push-button portions provided on the top of the spring portions respectively, and a light source, wherein a portion of the button base portion which permits distribution of light at least from an outer edge portion thereof to all of the spring portions and the push-button portions is formed as a light conducting portion thereof using a transparent resin, the light source is disposed face to face with the outer edge portion in the light conducting portion, and the spring portions are formed integrally with the light conducting portion by integral molding with use of a light diffuse-transmittable rubbery resin. With this self-lighting type push-button input device, it is made possible to reduce the number of light-sources, simplify the construction, and thereby solve the foregoing problem.

In another aspect of the invention there is provided a self-lighting type push-button input device comprising a button base portion including a plurality of push-button portions and an LED light source disposed sideways (on the plate thickness side) of the button base portion, wherein the button base portion is provided so as to surround the plural push-button portions, a light conducting portion is formed of a light transmitting resin on the button base portion, the light source is disposed sideways (on the plate thickness side) of the light conducting portion in such a manner that an optical axis thereof is substantially aligned with an intra-surface (plate thickness) direction or a light transmitting resin on the button base portion, and an optical barrier or a light diffusing portion (**32*e***) is provided at a position including a straight line jointing at least the light source and the push-button portion positioned closest to the light source.

According to an aspect of the invention, since the whole or a part of the button base portion is preferably formed as a light conducting portion using a transparent resin, all the push-button portions can be illuminated brightly with a smaller number of light sources than the number of the plural push-button portions provided on the button base portion. Consequently, there can be attained such excellent effects as a decrease in the number of parts, simplification of the construction, and the resulting reduction of cost.

BRIEF DESCRIPTION OF THE DRAWINGS

FIG. 11 is a schematic sectional view showing a portion of a conventional self-lighting type push-button input device.

DETAILED DESCRIPTION OF PREFERRED EMBODIMENTS

Figure 1:
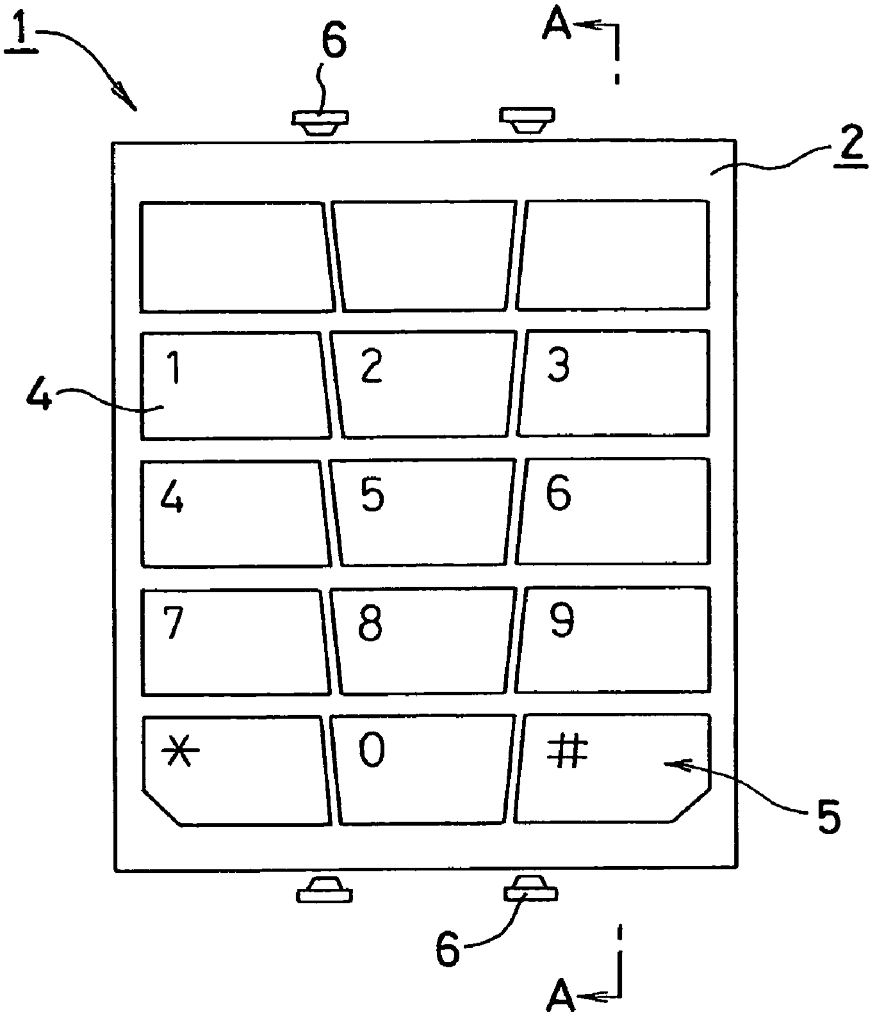
FIG. 1 is a plan view of a self-lighting type push-button portion input device according to an embodiment of the invention.
Figure 2:
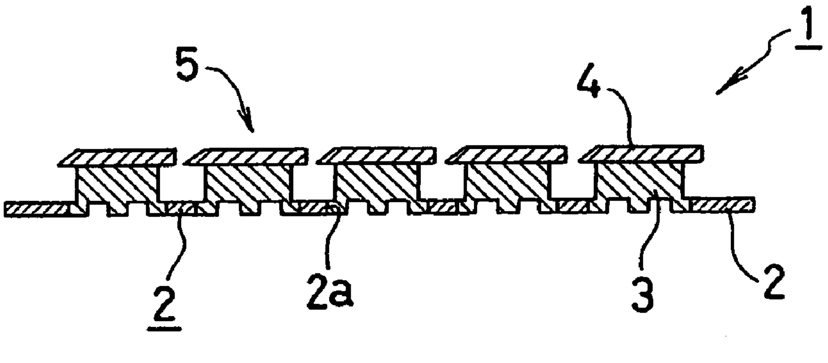
FIG. 2 is a sectional view taken on line A-A in FIG. 1.

The present invention will be described in detail hereunder by way of embodiments thereof. FIGS. 1 and 2 show a self-lighting type push-button input device 1 according to an embodiment of the invention. Although the following description is based on the assumption that the self-lighting push-button input device 1 is an operating panel of a portable telephone, the present invention is not limited thereto.

According to a basic construction of the self-lighting type push-button input device 1, a generally plate-like button base portion 2 can be formed of a rigid resin. For example, three columns by five rows of push-button units 5 can be provided on the button base portion 2. The push-button units 5 each can include a spring portion 3 formed of resin having a suitable elasticity such as silicone rubber and a push-button 4 formed of a rigid resin on top of the spring portion 3 to indicate a character or a symbol.

As the material of the button base portion 2 there is adopted a preferably rigid and transparent resin such as, for example, acrylic resin or polycarbonate resin. An appropriate number of light sources 6, e.g., LED lamps, can be disposed at appropriate positions along an outer periphery portion of the button base portion 2 so as to confront the outer periphery portion. The positions and number of the light sources 6 can be determined so that all of the push-button units 5 are illuminated as uniformly as possible in the actual self-lighting type push-button input device 1.

A predetermined number of holes 2*a* can be formed in the button base portion 2 at positions where the push-button units 5 are to be provided, and the spring portions 3 can be formed on inner surfaces of the holes 2*a* respectively by integral molding. The silicone rubber that preferably forms the spring portions 3 can be selected as a transparent one, in which a light diffusing agent is incorporated to diffuse light incident on the interiors of the spring portion 3.

The push-button portions 4 are for indication of characters, numerals, symbols, etc. and are operated by being touched by a user. Therefore, as the material of the push-button portions 4 there is selected a material such that the characters, numerals, or symbols formed by printing or stamping can be read clearly with light diffused in the spring portions 3 and are not easily worn or extinguished by contact therewith of the user's hand or fingers.

Next, the operation and effect of the self-lighting type push-button input device 1 constructed as above will be described. Light which is emitted from the light sources 6 into the button base portion 2 prevails substantially the whole surface of the button base portion 2, including upper and lower surfaces, while preferably making total reflection on boundary surface between the button and the atmosphere. For example, when the light sources 6 into the button base portion 2 so as to sandwich of the substantially the whole surface of the button base portion 2, substantially the whole of an inner surface of the button base portion can be illuminated with uniform brightness.

Light which has reached each hole 2*a* enters the spring portions 3 which are preferably in contact with the hole 2*a*. Then, the light can be diffused with the light diffusing agent incorporated in silicone rubber which forms the spring portion 3 and can be released as diffused light to the exterior. The diffused light passes through the push-button portion 4 which covers the spring portion 3 from the operating side, whereby for example a character or figure formed in the push-button portion 4 can be seen in an illuminated state.

Figure 3:
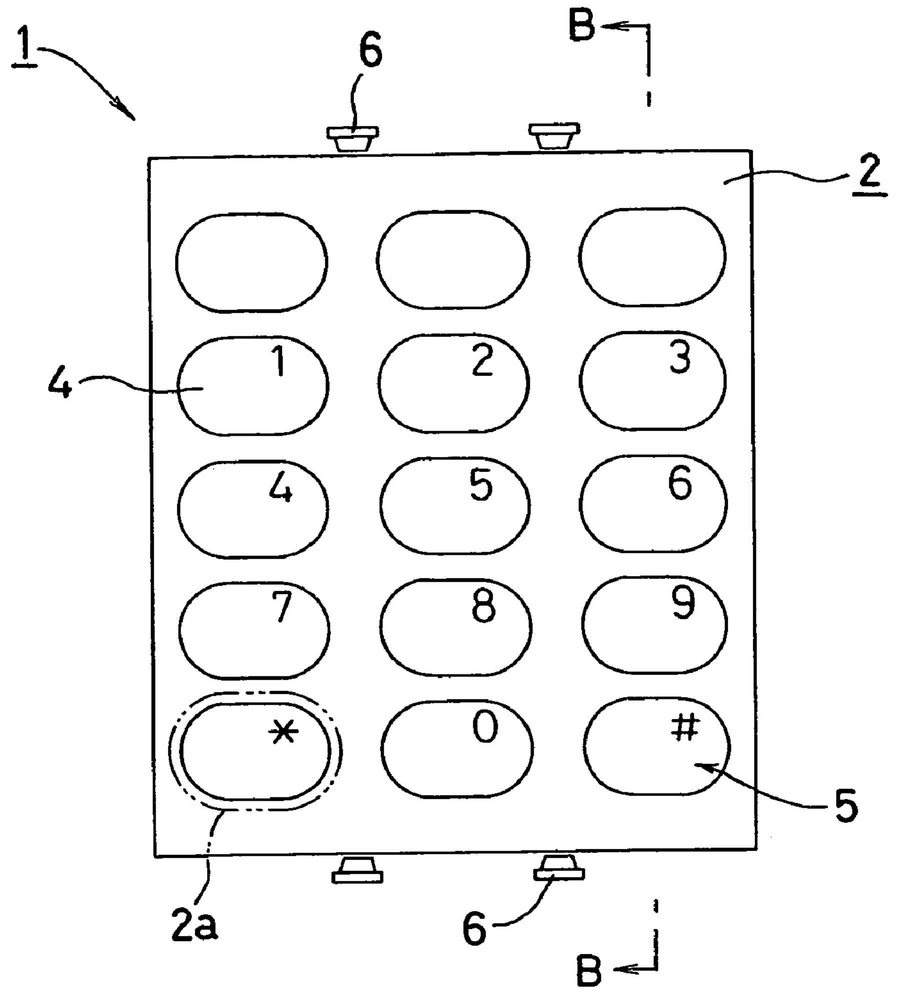
FIG. 3 is a plan view showing a modification of the embodiment of FIG. 1.
Figure 4:
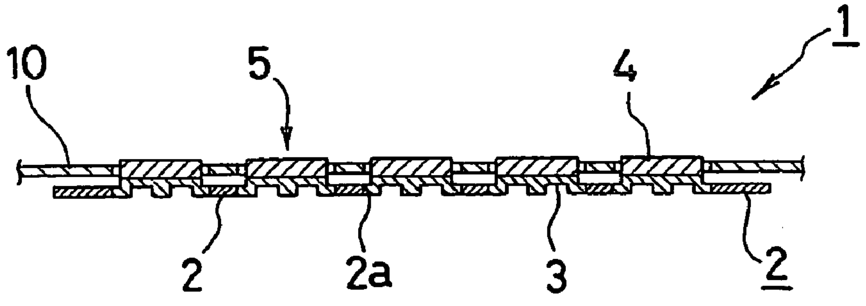
FIG. 4 is a sectional view taken on line B-B in FIG. 3.

In the self-lighting type push-button input device 1 of this type, a cover 10 may be attached to the device so that only the push-button portions 4 can be seen from the user side, as shown in FIGS. 3 and 4. Thus, a design-oriented modification may be made to improve the beauty of the device. For example, a portion to be kept invisible from the user side, such as the surface of the button base portion 2, may be covered.

Thus, since the button base portion 2 can be formed of a transparent resin, in the inner surface of the button base portion 2, as noted above, the light from the light sources 6 once enters the interior through two opposed plate side faces repeats internal reflection within the button base portion 2 which has a higher refractive index than the atmosphere, thereby providing a nearly uniform brightness. Since the above internal reflection is performed at a high reflectance within the transparent material, a light quantity loss caused by reflection is very small.

Thus, a nearly uniform and sufficient quantity of light can be fed to the holes 2*a*, i.e., the spring portions 3, no matter at which positions in the button base portion 2 the holes or the spring portions may be located. Therefore, the number of the push-button units 5 provided within the button base portion 2 and that of the light sources need not be made 1:1 corresponding to each other. In this embodiment, with four light sources 6 relative to fifteen push-button units 5, illumination can be done at a uniform and sufficient quantity of light, thus permitting the reduction in the number of parts and simplification of construction.

Figure 5:
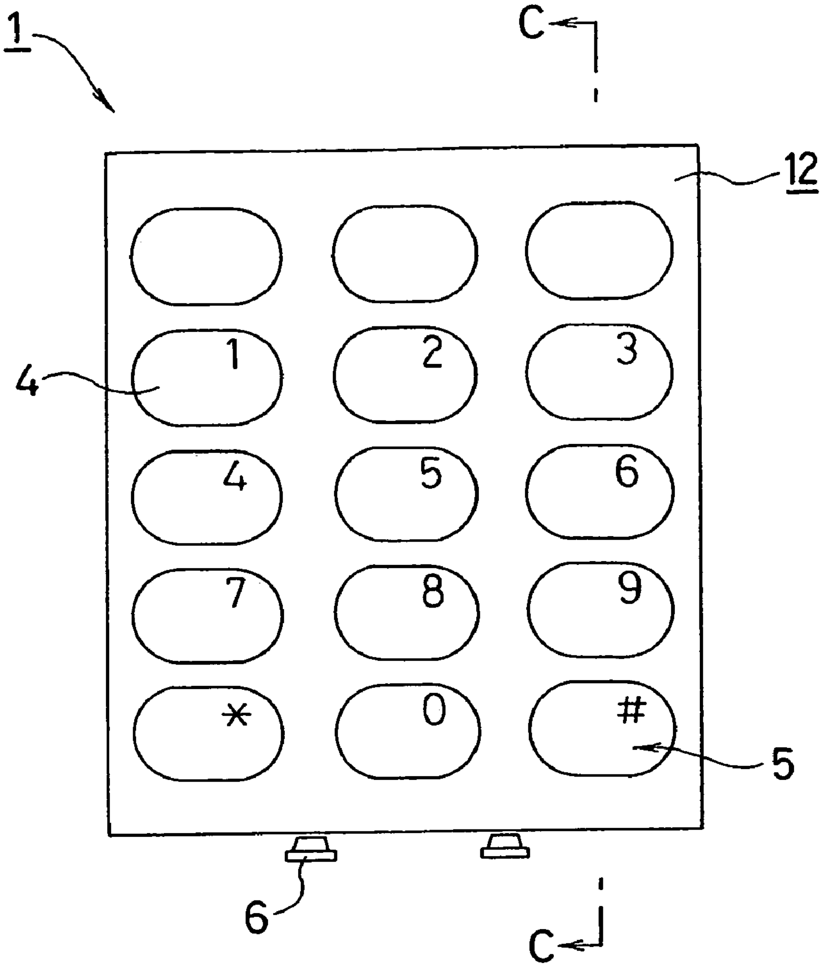
FIG. 5 is a plan view of a self-lighting type push-button portion input device according to another embodiment of the invention.
Figure 6:
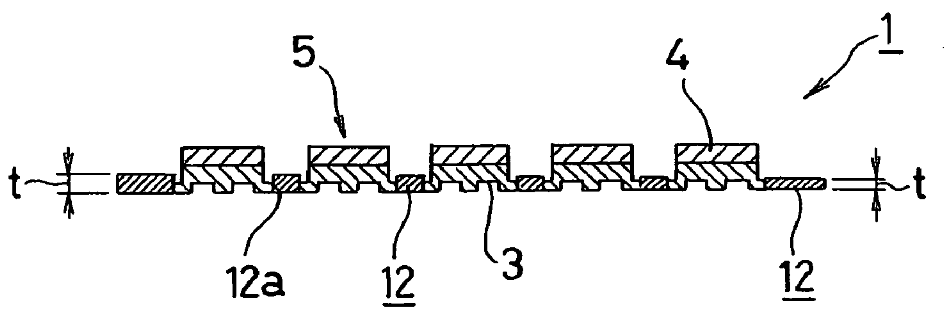
FIG. 6 is a sectional view taken on line C-C in FIG. 5.

FIGS. 5 and 6 illustrate a self-lighting type push-button input device 1 according to another embodiment of the invention. The embodiment of FIGS. 5 and 6 can simplify the construction and reduce the size. In this embodiment, the thickness t of a button base portion 12 can be made larger gradually from one end side toward an opposite end side and light sources 6 can be disposed on only the thicker end side.

In the construction of the embodiment of FIG. 1, the brightness becomes lower with separation from the light sources, and for compensating this inconvenience, the light sources 6 can be mounted on two confronting sides for example. According to the construction of the embodiment of FIGS. 5 and 6, by making the thickness t smaller with separation from the light sources 6, a luminous flux density is enhanced, and even with light sources 6 mounted on only one side (see FIG. 5), a uniform light quantity can be fed to all of the push-button units 5. Thus, it suffices to provide the light sources 6 and their mounting mechanism on only one side, whereby not only the simplification of construction but also the reduction of size can be attained.

Figure 7:
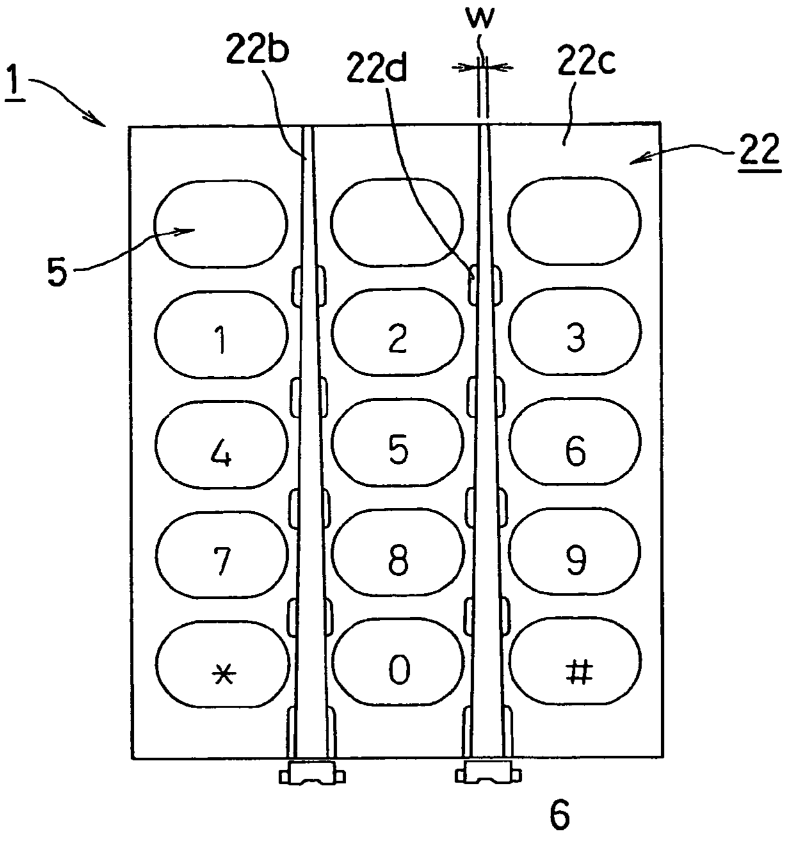
FIG. 7 is a plan view of a self-lighting type push-button portion input device according to another embodiment of the invention.

FIG. 7 illustrates a self-lighting type push-button input device according to another embodiment of the invention. In both the embodiments of FIG. 1 and FIG. 5, the whole of the button base portions 2 and 12 is preferably formed of a rigid and transparent resin, and holes 2*a* and 12*a* for mounting the push-button units 5 are formed at predetermined positions.

In the embodiment of FIG. 7, a button base portion 22 can be formed by a combination of a rigid and transparent resin such as an acrylic resin or a polycarbonate resin and a relatively soft, elastic and light diffuse-transmittable resin such as silicone rubber with a light diffusing agent incorporated therein. In the portion formed by the silicone rubber, spring portions 3 can be formed of the same material by integral molding (see FIGS. 4 and 6). According to this construction, the portion through which the light from a light source 6 is conducted can be the only portion formed of the transparent resin. In the embodiment of FIG. 7, this portion formed of the transparent resin is designated a light conducting portion 22*b*, and the light source 6 is attached to the light conducting portion 22*b*.

A description will now be given of the other portion, indicated at 22*c*, than the light conducting portion 22*b*. Since the other portion 22*c* can be formed of silicone rubber with a light diffusing agent incorporated therein, the light passing through the interior thereof is not diffused, but is radiated to the exterior. Consequently, the light transfer distance is short and thus the other portion 22*c* may not be suitable as a light conducting portion. It is preferable not to introduce light into this portion because the amount of light capable of being distributed to the spring portions 3 can be increased.

In the embodiment of FIG. 7, on the basis of the results obtained above, at the time of integrally molding the light conducting portion 22*b* and the other portion 22*c* of silicone rubber to constitute the button base portion 22, slits 22*d* can be formed in the other portion 22*c* at positions other than the vicinity of the spring portions 3 to prevent the light transmitted through the interior of the light conducting portion 22*b* from leaking out directly to the other portion 22*c*.

The width w of the light conducting portion 22*b* becomes narrower as the distance from the mounted position of the light source 6 becomes longer, whereby a uniform illuminance can be obtained in the longitudinal direction. By so doing, light can be radiated to only the required portion, and even in the case where a part of the button base portion 22 is formed using a light diff-using material with a light diffusing agent incorporated therein, it is possible to apply light to only the required portion and the deficiency in light quantity does not occur even without increasing the number of light source 6.

Figure 8:
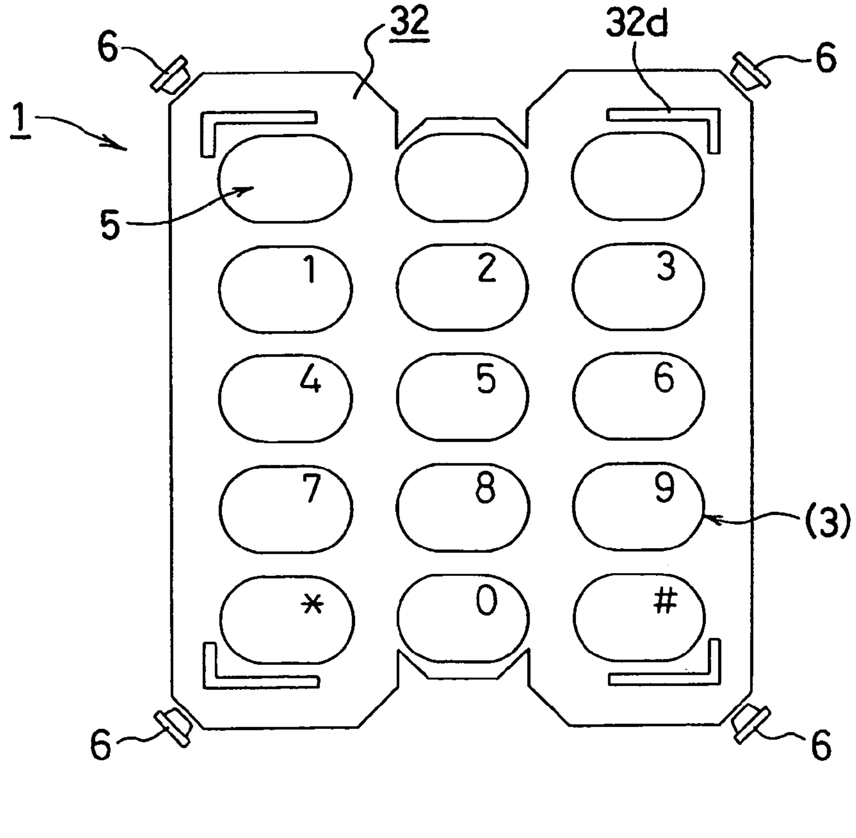
FIG. 8 is a plan view of a self-lighting type push-button portion input device according to another embodiment of the invention.

FIG. 8 illustrates a self-lighting type push-button input device 1 according to another embodiment of the invention. This embodiment comprises adding the method/apparatus adopted in the embodiment of FIG. 7 to the embodiment of FIG. 1 (or to the embodiment of FIG. 5), thereby making illumination still more uniform and improvingly the quality without any substantial increase of cost.

A study will now be made about the problem in quality of for example the self-lighting type push-button input device 1 of the embodiment of FIG. 1. The brightness at each of various positions in the button base portion 2 (12) can be determined by the total of the quantity of light propagated by repetition of internal reflection on the surface of contact total of the button base portion 2 with the atmosphere and the quantity of light emitted directly from the light sources 6.

The quantity of propagated by repetition of internal reflection has a strong tendency to making the brightness of the interior of the button base portion 2 uniform, while the quantity of direct light from the light sources 6 is in inverse proportion to the square of distance and hence the shorter the distance, the stronger the brightness. Therefore, if the direct light portion is excluded from the light emitted from the light sources 6 and reaching the spring portion 3, the push button portions 4 can be illuminated with a more uniform brightness.

In the embodiment of FIG. 8, on the basis of the conclusion obtained above, slits 32*d* are preferably formed as optical barriers through a button base portion 32 in the thickness direction of the button base portion and at positions substantially confronting the positions where light sources 6 are installed. Preferably, the angle of each slit 32*d* is set at an angle shallower than about 45° relative to the traveling direction of the light emitted from the associated light source 6 so as to induce an internal reflection and lest the slit 32*d* should release light into the atmosphere which would cause a loss in light quantity. In the embodiment of FIG. 8, the slits 32*d* can be formed in the four corners of the button base position 32 which positions are easy to satisfy the above condition.

Each slit 32*d* is preferably formed in such a range as to prevent the direct light from the associated light source 6 from reaching the spring portion 3. According to the results of studies made by the present inventors, it has been confirmed that if the slit 32*d* is formed so that the direct light from the light source 6 and the light emitted from the light source 6 and after a single internal reflection do not reach the spring portion 3, there is obtained a substantially uniform illumination effect.

Figure 9:
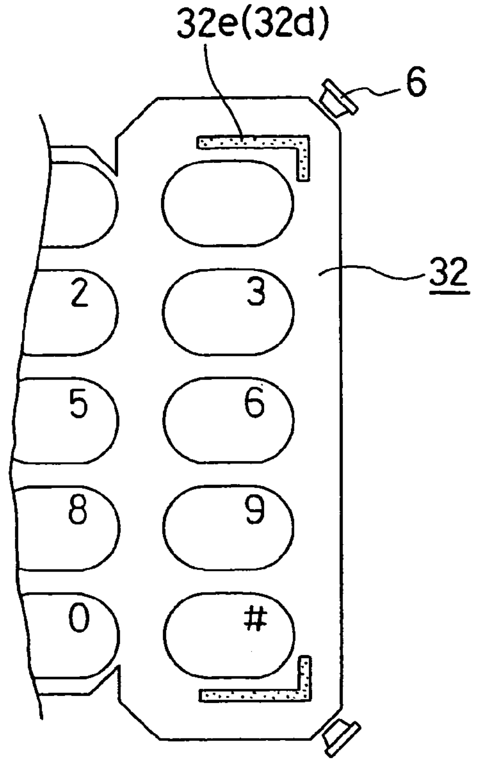
FIG. 9 is a plan view showing a portion of a self-lighting type push-button portion input device according to another embodiment of the invention.

FIG. 9 illustrates a self-lighting type push-button input device according to another embodiment of the invention. In view of a conclusion mentioned in the discussion of the embodiment of FIG. 8, if the direct light from each light source 6 is prevented from reaching the spring portion 3, the uniformity of illumination between adjacent push-button units 5 can be improved to a considerable extent.

In the embodiment of FIG. 9, therefore, the formation of the slit 32*d* in the incident portion of the direct light from each light source 6 on the spring portion 3 can be the same as in the embodiment of FIG. 8, but the same material as the material of the spring portion 3 is preferably incorporated into the slit 32*d* in the spring portion forming step to afford a light diffusion portion 32*e*.

With the light diffusion portion 32*e*, the light passing through the light diffusing portion 32*e* is diffused and can reach the spring portion 3 in the diffused state. That is, diffusion of light is conducted again in each spring portion 3, so that such an extreme increase of brightness as in the arrival of the direct light at the spring portion is not felt and it becomes possible to make the illumination uniform between adjacent push-button units 5.

In the case of each slit 32*d* formed in the embodiment of FIG. 9, it suffices to transmit the diffuse light by a light diffusing agent—added silicone rubber or the like injected into the slit, and such an internal reflecting function for the light emitted from each light source as in the embodiment of FIG. 8 is not required. Therefore, the degree of morphological freedom at the time of forming the slits 32*d* is high and there accrues an advantage that the formation of the slits 32*d* is easy.

Figure 10:
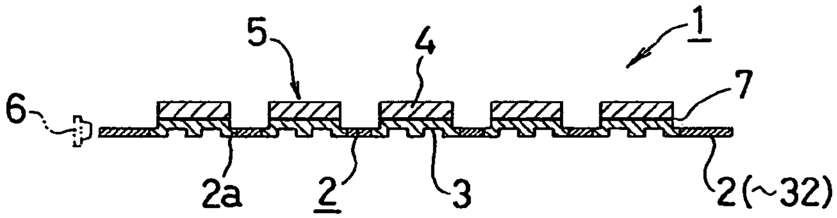
FIG. 10 is a sectional view showing a portion of a self-lighting type push-button portion input device according to another embodiment of the invention.
Figure 10:
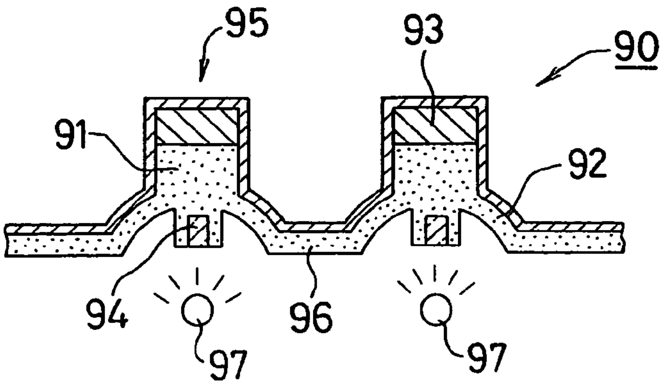

FIG. 10 illustrates a portion of a self-lighting type push-button input device according to another embodiment of the invention. According to the recent tendency, even in the case where light emitted from each light source 6 such as an LED lamp is used for illumination, it sometimes is required that the illumination be made using light of a color different from the color of the light emitted from the LED lamp.

To meet such a requirement, the present invention provides the construction shown in FIG. 10. Spring portions 3 can be integrally formed using silicone rubber with a light diffusing agent incorporated therein at predetermined positions on the button base portion 2 (~32) which is formed in the same way as in any of the above-described embodiments. Thereafter, a color transformation layer 7 can be formed for example by the same integral molding means as above using silicone rubber with a fluorescent material incorporated therein, the fluorescent material being for example blue photo-excited and emitting yellow color, or using a suitable resin. Alternatively, spring portions 3 are formed beforehand in a disc shape and are then attached to the button base portion by sticking or fusion. In addition, push-button portions 4 can be attached to the spring portion 3. As light sources 6 there can be adopted LED lamps which emit blue color.

According to this construction, light radiated to the exterior from the push-button portions 4 becomes a mixed light of blue light emitted from the LED lamps as the light sources 6 and yellow light photo-excited by the fluorescent material. That is, white light is obtained. This white light may be obtained by the combination of LED lamps which emits a near-ultraviolet light and a fluorescent material which emits the three primary colors of R (red), G (green), and B (blue). Also in this case, the same construction as above is applicable.

Having described preferred embodiments consistent with the invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. A self-lighting type push-button input device comprising:

a button base portion formed of resin in a generally plate shape, a plurality of spring portions formed of a rubbery resin so as to permit a stroke motion thereof relative to said button base portion, a plurality of push-button portions provided on top of said spring portions respectively, and a light source, wherein a portion of said button base portion which permits distribution of light at least from an outer edge portion to all of said spring portions and said push-button portions is formed as a light conducting portion using a transparent resin, said light source is disposed face to face with said outer edge portion in said light conducting portion, and said spring portions are formed integrally with said light conducting portion by integral molding with use of a light diffuse-transmittable rubbery resin.

2. A self-lighting type push-button input device according to claim 1, wherein an optical barrier for permitting said push-button portions to be illuminated at a uniform illuminance is provided adjacent the portion of said light conducting portion confronting said light source.

3. A self-lighting type push-button input device according to claim 2, wherein said optical barrier is a cut-out portion or a though hole formed in said light conducting portion.

4. A self-lighting type push-button input device according to claim 3, wherein a layer containing a fluorescent material is provided in said push-button portions, thereby allowing the push-button portions to radiate light of a color different from the color of the light emitted from said light source.

5. A self-lighting type push-button input device according to claim 3, wherein said light source is provided at each corner of said button base portion.

6. A self-lighting type push-button input device according to claim 2, wherein said optical barrier is a cut-out portion or a though hole formed in said light conducting portion, and a material lower in refractive index than said light conducting portion is charged into said cut-out portion or said though hole by integral molding.

7. A self-lighting type push-button input device according to claim 6, wherein said material lower in refractive index than said light conducting portion is a light diffuse-transmittable rubbery material of which said push-button portions are formed.

8. A self-lighting type push-button input device according to claim 7, wherein said light source is provided at each corner of said button base portion.

9. A self-lighting type push-button input device according to claim 7, wherein a layer containing a fluorescent material is provided in said push-button portions, thereby allowing the push-button portions to radiate light of a color different from the color of the light emitted from said light source.

10. A self-lighting type push-button input device according to claim 6, wherein said light source is provided at each corner of said button base portion.

11. A self-lighting type push-button input device according to claim 6, wherein a layer containing a fluorescent material is provided in said push-button portions, thereby allowing the push-button portions to radiate light of a color different from the color of the light emitted from said light source.

12. A self-lighting type push-button input device according to claim 2, wherein a layer containing a fluorescent material is provided in said push-button portions, thereby allowing the push-button portions to radiate light of a color different from the color of the light emitted from said light source.

13. A self-lighting type push-button input device according to claim 1, wherein said light source is provided at each corner of said button base portion.

14. A self-lighting type push-button input device according to claim 13, wherein a layer containing a fluorescent material is provided in said push-button portions, thereby allowing the push-button portions to radiate light of a color different from the color of the light emitted from said light source.

15. A self-lighting type push-button input device according to claim 1, wherein a layer containing a fluorescent material is provided in said push-button portions, thereby allowing the push-button portions to radiate light of a color different from the color of the light emitted from said light source.

16. A self-lighting type push-button input device according to claim 2, wherein said light source is provided at each corner of said button base portion.

17. A self-lighting type push-button input device comprising:

a button including a button base portion and a plurality of push-button portions, an LED light source disposed sideways of said button base portion, wherein said button base portion is provided so as to surround said plural push-button portions, a light conducting portion is formed of a light transmitting resin on said button base portion, said light source is disposed sideways of said light conducting portion in such a manner that an optical axis thereof is substantially aligned with an intra-surface direction of said button base portion, and an optical barrier or a light diffusing portion is provided in the button base portion at a position including a straight line joining at least the light source and the push-button portion positioned closest to the light source.

18. A self-lighting type push-button input device according to claim 17, wherein said button base portion is generally quadrangular in planar shape, said plural push-button portions are arranged in matrix form on said button base portion, and said light source is disposed sideways of said button base portion so as to emit light toward the button base portion located between adjacent rows or columns of the push-button portions arranged in matrix form.

19. A self-lighting type push-button input device according to claim 17, wherein said button base portion is generally quadrangular in planar shape, said light source has an optical axis extending toward the push-button portions which are arranged in matrix form, said light source has an optical axis extending toward the push-button portions positioned at a corner out of the push-button portions arranged in matrix form, and a slit as an optical barrier is formed between the light source and the push-button portion at said corner.

* * * * *

UNITED STATES PATENT AND TRADEMARK OFFICE

CERTIFICATE OF CORRECTION

PATENT NO. : 7,266,194 B2
APPLICATION NO. : 10/960763
DATED : September 4, 2007
INVENTOR(S) : Tsuyoshi Saeki et al.

It is certified that error appears in the above-identified patent and that said Letters Patent is hereby corrected as shown below:

Correct the Title Page (73) to read as follows:

Assignee: Stanley Electric Co., Ltd., Tokyo (JP)
Polymatech Co., Ltd., Tokyo (JP)

Signed and Sealed this

Twentieth Day of November, 2007

JON W. DUDAS
*Director of the United States Patent and Trademark Office*